July 15, 1958　　　M. E. JONES　　　2,843,333
SPINNING RATCHET REEL
Filed Sept. 14, 1954　　　2 Sheets-Sheet 2
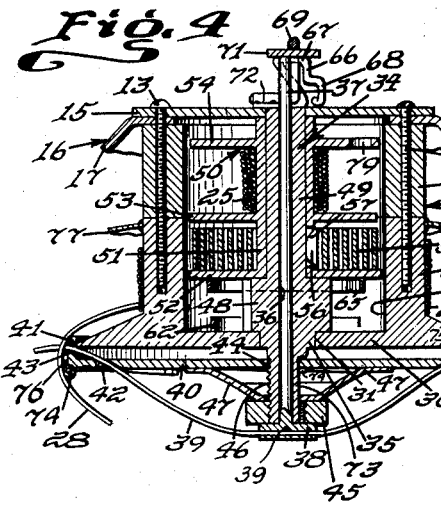
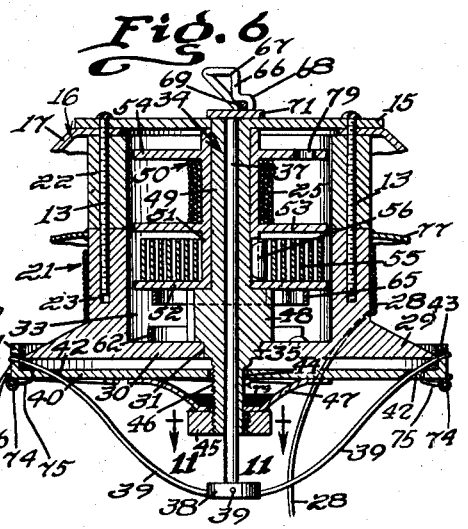
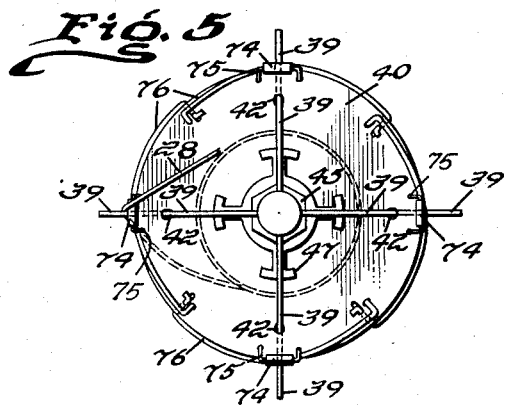
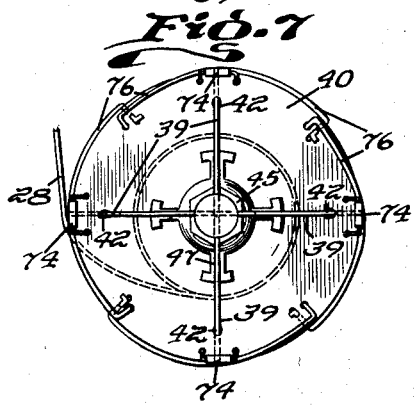
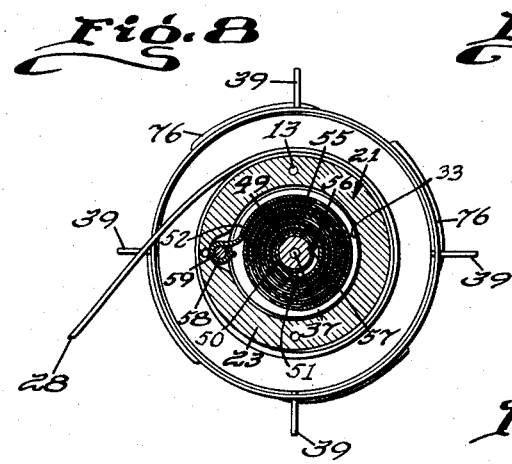
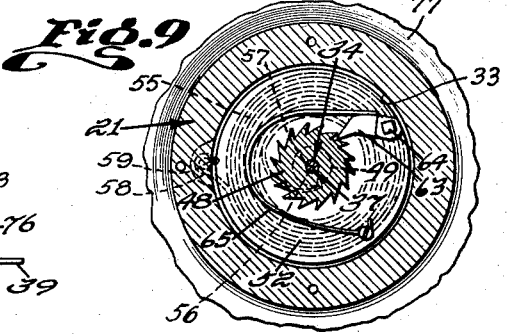
INVENTOR.
Martin E. Jones
BY Victor J. Evans & Co.
ATTORNEYS

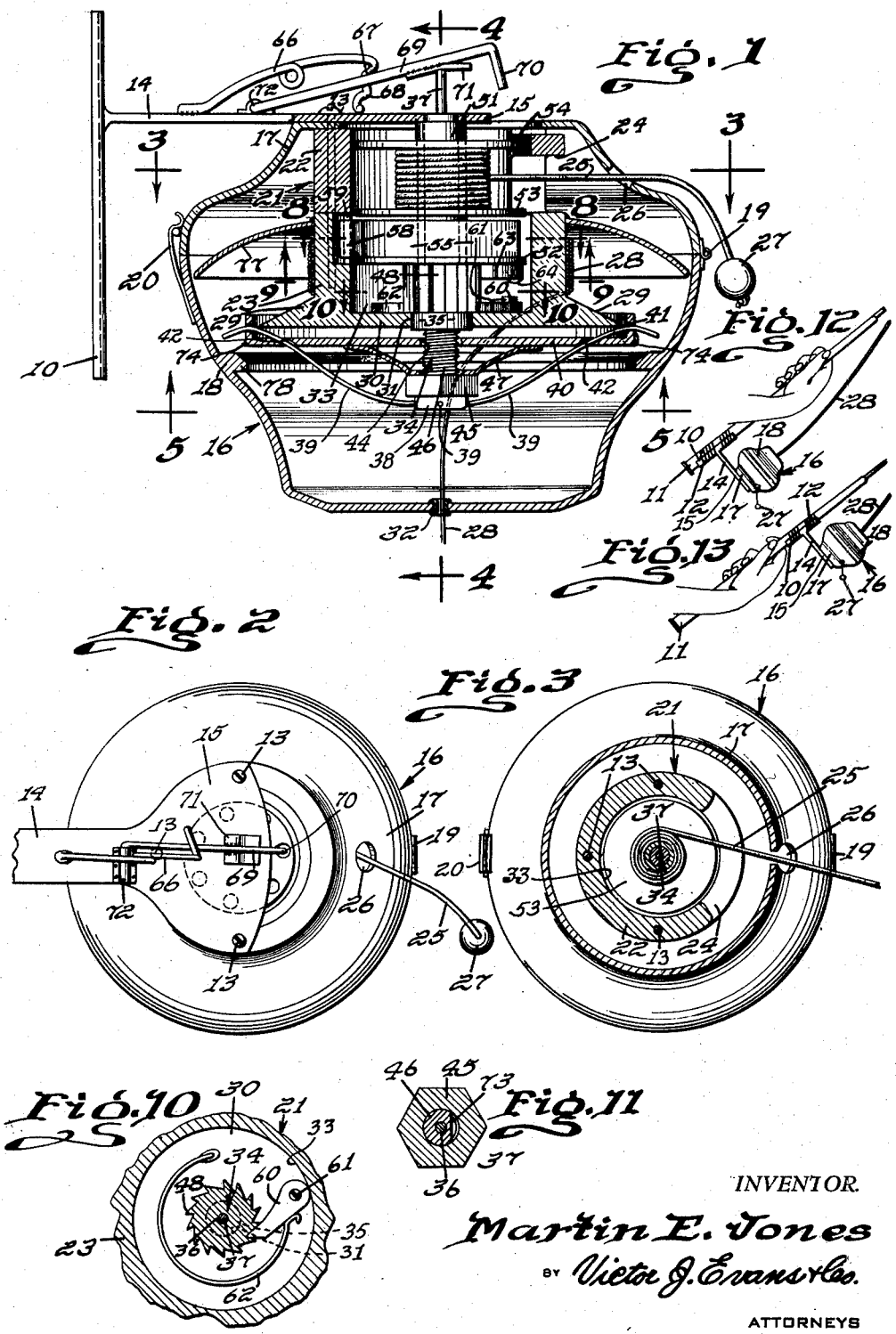

United States Patent Office 2,843,333
Patented July 15, 1958

2,843,333

SPINNING RATCHET REEL

Martin E. Jones, Granite Falls, N. C.

Application September 14, 1954, Serial No. 455,961

2 Claims. (Cl. 242—84.2)

This invention relates to fishing tackle or equipment, and more particularly to a spinning ratchet reel for a fishing rod.

The object of the invention is to provide a spinning ratchet reel which will automatically retrieve a fishing line when desired.

Another object of the invention is to provide a spinning ratchet reel for a fishing rod which includes a hollow housing that is adapted to be mounted on the fishing rod, there being a reel mounted in the housing and having a spring member and pull cord arranged in engagement therewith, the reel adapted to have a fishing line wound thereon, so that by actuating the pull cord the fishing line can be automatically retrieved or wound on the reel.

Another object of the invention is to provide a spinning ratchet reel which can be used for winding line upon the reel and wherein the reel may be mounted in back of the hand on fly rods or else the reel can be arranged forward of the hand on casting rods and wherein there is no possibility of the parts becoming entangled during use.

A further object of the invention is to provide a spinning ratchet reel which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a longitudinal sectional view taken through the spinning ratchet reel, constructed according to the present invention.

Figure 2 is an end elevational view of the spinning ratchet reel.

Figure 3 is a sectional view taken on the line 3—3 of Figure 1.

Figure 4 is a sectional view taken on the line 4—4 of Figure 1.

Figure 5 is a sectional view taken on the line 5—5 of Figure 1.

Figure 6 is a view similar to Figure 4 but showing the parts in released position as when the line is being cast.

Figure 7 is a view similar to Figure 5, but showing the position of the parts in released position as when the line is being cast.

Figure 8 is a sectional view taken on the line 8—8 of Figure 1.

Figure 9 is a sectional view taken on the line 9—9 of Figure 1.

Figure 10 is a sectional view taken on the line 10—10 of Figure 1.

Figure 11 is a sectional view taken on the line 11—11 of Figure 6.

Figure 12 is a view showing the reel mounted in one position on a fishing rod such as a fly rod.

Figure 13 is a view similar to Figure 12 but showing the reel mounted in front of the fisherman's hand on a casting rod.

Referring in detail to the drawings, the numeral 10 designates a base which is adapted to be connected to a fishing rod such as the rod 11 in any suitable manner. Thus, the base 10 can be connected to the fishing rod 11 by means of a suitable wire 12 which can be wrapped around the base 10 and around the fishing rod. Extending from the base 10 and secured thereto in any suitable manner, as for example by welding is an arm 14, and the arm 14 includes a widened end portion 15, Figure 2. Secured to the widened end portion 15 of the arm 14 in any suitable manner, as for example by means of the bolts or screws 13, is a hollow housing 16. The housing 16 includes a pair of sections 17 and 18 which are hingedly connected together by means of a hinge 19, Figures 1, 2 and 3, and a latch 20 is provided for maintaining the sections 17 and 18 connected together. However, since these sections are hingedly connected together, they can be opened or swung apart as when a new fishing line is to be inserted therein or when any of the parts are to be replaced or cleaned.

Positioned within the housing 16 is a reel 21 which includes a base 22 and a support member 23. These members 22 and 23 are connected to each other and are connected to the housing 16 and end portion 15 by means of the bolts 13. The base 22 is provided with a cutout 24 through which projects a pull cord 25, and the pull cord 25 also extends through an opening 26 in the section 17 of the housing. A finger engaging piece 27 is mounted on the free end of the pull cord 25 for facilitating the pulling of the cord.

Wound on the cylindrical portion of the support member 23 is a fishing line 28, and for guiding the fishing line onto the support member 23, a tapered flange or skirt 29 is formed integral with or secured to the support member. The support member further includes an end wall 30 which is provided with a central opening 31. An apertured bushing 32 is mounted in the section 18 of the housing 16 for the projection therethrough of the fishing line 28. The interior of the reel 21 is hollow to define a chamber 33, Figures 4 and 6, and extending through the reel 21 is a shaft 34. The shaft 34 includes an annular collar 35 which rotatably engages the opening 31 in the end wall 30. The shaft 34 is further provided with a longitudinally extending bore 36 which slidably receives therein a pin 37. Mounted on an end of the pin 37 is a head 38 which carries a plurality of body members 39 that can be made of any suitable yieldable material such as spring wire. The ends of the body members 39 slidably project through openings 42 in a disc 40, and the ends of the body members 39 also project through apertures 43 in an annular flange 41 which is formed integral with or secured to the disc 40. The disc 40 can rotate independently of the reel 21 and there is provided a central opening 44 in the disc 40 for the projection therethrough of a portion of the shaft 34.

A means is provided for maintaining the shaft 34 connected to the disc 40, and this means comprises a nut 45 which is arranged in threaded engagement with a threaded portion 46 of the shaft 34. A yoke including a plurality of spring arms 47 is interposed between the disc 40 and the head 38. Thus, by unscrewing the nut 45 from the threaded portion 46, the shaft 34 can be disconnected from the disc. The shaft 34 further includes a gear member 48 which has a plurality of teeth thereon, and arranged contiguous to the gear member 48 on the shaft 34 is a smooth cylindrical portion 49.

Positioned within the chamber 33 in the reel 21 and rotatably mounted on the cylindrical portion 49 of the shaft 34 is a spool 50. The spool 50 includes a hub 51 that rotatably engages the shaft, and the spool 50 further includes a first, second and third annular partition 52, 53, and 54. Circumposed on the hub 51 and interposed between the pair of partitions 52 and 53 is a spring member 55, Figures 4 and 8, and the spring member 55 has an end 56 arranged in engagement with a notch 57 in the hub 51. The other end of the spring member 55 is shaped to provide a hook 58 which engages a lug or pin 59 that is secured to the support member 23 of the spool 21. Thus, one end of the spring member 55 is connected to the reel 21, while the other end of the spring member 55 is connected to the spool 50. The pull cord 25 is also trained or wound on the hub 51 of the spool 50, but the pull cord 25 is interposed between the pair of partitions 53 and 54 and is thus maintained separated from the spring member 55 by means of the partition 53.

Arranged in engagement with the teeth of the gear member 48 is a first pawl 60, Figure 10, and the pawl 60 is pivotally connected to the end wall 30 of the support member 23 by means of a pivot pin 61. A spring 62 serves to urge or bias the ratchet or pawl 60 into engagement with the gear member 48 which is on the shaft 34. There is further provided a second pawl 63, Figure 9, and the pawl 63 is pivotally connected to the partition 52 of the spool 50 by means of a pivot pin 64. A spring member 65 urges or biases the pawl 63 into engagement with the gear member 48. Secured to the arm 14 is a spring 66 which includes a pair of offset sections 67 and 68 that define shoulders, and a lever 69 is mounted for movement into and out of engagement with the offset sections 67 and 68 of the spring 66. A transverse finger 70 extends from an end of the lever 69. A plate 71 is secured to the lever 69 in any suitable manner, as for example by welding, and the plate 71 abuts or engages the projecting end of the pin 37. The lever 69 is hingedly or pivotally connected to the arm 14 by means of a hinge 72. Thus, by manually depressing the lever 69, the lever 69 can be moved from the position shown in Figures 1 and 4 to the position shown in Figure 6 so that the pin 37 and its associated parts will also move to the position shown in Figure 6. A portion of the shaft 34 adjacent the threaded section 46 is cut away as at 73, Figure 11. There is further provided a plurality of brackets 75 which are secured to the disc 40, and the brackets 75 provide supports for rollers 74 which are adapted to be engaged by the fishing line 28 so as to insure that the fishing line will move smoothly on and off the reel 21. Guide wires 76 are also connected to the disc 40, and the guide wires 76 prevent the fishing line from becoming entangled in the rollers 74 and serve to guide the fishing line onto the rollers whereby the fishing line will not become entangled in the ends of the rollers.

Extending outwardly from the reel 21 and secured thereto is a curved annular skirt 77 which serves to maintain the fishing line 28 in its proper position on the support member 23. An annular flange 78 extends inwardly from the section 18 of the housing 16 for a purpose to be later described.

From the foregoing it is apparent that there has been provided a spinning ratchet reel for a fishing rod such as the rod 11 wherein the reel can be set so that the line 28 can be cast or played out. With the pull cord 25 wound on the spool, the reel is ready for the next operation. By manually depressing the lever 69, the plate 71 will force the pin 37 from the position shown in Figures 1 and 4 to the position shown in Figure 6 so that the fishing line 28 is free to be unwound from the support member 23 of the reel as when the line is being cast. When tension on the spring 55 is released with the parts in the position shown in Figure 4, the line 28 will be automatically retrieved or wound on the support member 23, since the disc 40 and pin 37 will be rotated. Thus, with the parts shown in the position of Figure 4 the nut 45 bears against the head 38 by friction due to the pressure exerted by the spring arms 47 so that the shaft 34 will rotate and this in turn will cause rotation of the pin and head 38. As the head 38 moves around, the body members 39 will also rotate or move around to thereby engage the fishing line and move it onto the support member 23. The tapered surface 29 serves as a guide for the fishing line. The pawl 60 serves as a brake to prevent rotation of the shaft 34 when the spool 50 is rotating to wind or rewind the pull cord 25 thereon. By manually depressing the pin 37 to the position shown in Figure 6, it will be seen that the ends of the body members 39 are withdrawn to a position flush with the flange 41 so that there will be no interference with the fishing line as during casting. The offset shoulder 68 serves to receive the rod 69 when the rod 69 is in its depressed or downward position as shown in Figure 6, and the offset shoulder 67 receives the rod 69 when the rod is in its raised position as shown in Figures 1 and 4.

A pair of metal rings can be arranged in engagement with the handle of the rod 11 for clamping the base 10 to the rod. The reel may be mounted in back of the hand as shown in Figure 12 on fly rods. Or, the reel can be mounted forward of the hand as shown in Figure 13 on casting rods and the seat or base 10 will fit practically all fishing rods. To cast, the person can hold the fishing line 28 with the left hand, and the rod with the right hand, and then swing the rod and release the line from the left hand. Or, the person may hold the rod in the right or left hand just in front of the reel and with the thumb and index finger of the same hand hold the line and then release the line while casting. If the reel is mounted forward of the caster's hand, then, it will be necessary to hold the line in the left hand and release it during the cast. The finger 70 is released when the winding string 25 is pulled to retrieve the line. The rod may be held in either the right or the left hand and the pull string can be actuated or pulled by either the right or the left hand. The small rollers 74 prevent the fishing line 28 from cutting into the guide wires 76. The rear or upper notch 67 serves to limit upward pivotal movement of the rod 69. The other notch or shoulder 68 holds the rod or lever 69 in the position shown in Figure 6. In casting position as shown in Figure 6, the finger 70 extends into the adjacent portion of the housing 16 and also into a hole or opening 79 in the partition 54, Figures 4 and 6. Then, when the string 25 is pulled, the lever 69 jumps back into the position shown in Figure 1 as it is hit by the adjacent portion of the spool 50.

The reel operates by one manipulation since it is only necessary to push the rod 69 into the position shown in Figure 6 when a cast is to be made. Then, the string 25 is pulled and the reel automatically starts retrieving the line without the operator having to pull the pin out. In actual practice a plurality of the holes 79 may be cut or formed in the partition 54 so that the finger 70 can easily project into one of these holes. The small metal plate 71 is secured as by welding or soldering to the rod 69 so that when the rod 69 is pushed down, the plate 71 pushes the pin 37 in so that the reel will release the line. The rod 69 is held in its inward or lowered position by means of the shoulder 68. When the winding string or cord 25 is pulled to turn the spool 50, the spool forces the rod 69 up so that the finger 70 moves out of the hole 79 and the rod 69 is held by the upper notch 67 so that the reel will retrieve the line. The cut away portion 73 on the shaft is to keep the yoke 47 from turning on the shaft 34. The hole in the center of the yoke is supposed to fit the cut away portion of the shaft so that the yoke is locked on the shaft and can't turn. The yoke acts as a clutch so that if the pull on the fish line is stronger than the pressure of the yoke on the disc, the disc slips on the shaft letting out line.

The pawl 63 on the winding spool is to engage the gear on the shaft 34 to turn the disc 40 as the pull cord is pulled out. When the pull cord is released the spring under tension turns the winding spool to rewind the pull cord. The pawl slips on the gear until the spring is unwound. Pawl 60 keeps the gear and thus the disc from turning in the reverse during the unwinding of the spring and rewinding of the pull cord. Should a fish strike as the winding cord is being wound up, pawl 60 is engaged in the gear so that the disc can't turn unless the fish pulls hard enough to make the disc slip and turn under the yoke. When the pull cord is pulled, pawl 60 slips on the gear as long as it is turning. When the gear stops, pawl 60 holds the gear locked until the shaft is turned again by pawl 63.

The annular flange 78, extending inwardly from section 18 of the housing 16 is to keep the fish line away from the housing at this point so that the pins 39 turning under the flange will not fail to pick up the line or cut the line against the housing if the pins turned very close to the housing.

In using the reel, the rod is held in either the left or right hand, holding the fish line with the same hand between the index finger and thumb, giving a gentle swing, turning loose the fish line. The lure pulls the line freely from the reel. When the lure stops in the water, the rod is held in the same hand without changing and the retrieve started by pulling the pull cord. If during the retrieve one wants to change hands, the rod is easily shifted to the opposite and the retrieve continued. This allows the reel to be used as easily by a right or left handed person.

Although the fisherman retrieves the lure at a steady to and fro swing of the arm, the lure travels fast and slow in the water. As the pull cord is being pulled out, the pull on the lure is greater causing it to travel faster in the water. As the pull cord is being rewound, the lure slows down. This action of the reel gives more action to the lure and thus increases the chances of catching a fish.

Since there is no spool to be set in motion with each cast, there is no chance for the reel to "back lash." This makes the reel very good for casting at night. By holding the rod in the right hand, the fish line in the left, giving the rod a gentle swing releasing the fish line there is no jerk on the reel as there would be if a spool had to be set in motion. This allows one to cast live bait easily without jerking it off the hook. When the fish takes the bait, it can easily pull the line out of the reel. The reel will free the line as fast or as slow as the fish swims without any jerk or fouling of the line. This is a very desirable feature in a fish reel. If the fish feels any jerk or pull on the fish line before he has swallowed the bait, he is apt to drop it before the hook gets in his mouth, therefore to set the hook in the fish, it is necessary to pull the pull cord. The reel allows one to easily keep up with the fish if it should start toward the fisherman as he can pull the cord faster than he could wind with a handle. By the pull cord being indirectly connected to the fish line through the winding disc, the fisherman easily feels the movements of the fish on the fish line or the lure in the water. Should the pull cord slip out of the hand while pulling in a fish, the reel is held in a locked position so that the fish cannot get slack line. However, if the fish pulls hard enough the winding disc will slip giving out line until the fish stops pulling so hard, then the reel will start retrieving line.

As soon as the lure strikes the water, the line stops coming. The winding disc acts as a momental motor. When the pull cord is pulled and there is slight pull on the fish line, the disc will quickly take up the slack in the line at the beginning of the retrieve of the lure, or when pulling the hook from the water to a pier or bridge. By mounting the reel back of the hand, the fish rod has better balance, making casting easier. Since the reel has no handle, the operator's hands are not kept close to the reel. This allows him wider range of movement of the rod and still be able to retrieve line without losing his balance.

Another important operation of the reel is that it will cast and retrieve without tangling monofilament line. Also, since the line is wound on the reel and taken off the reel in the same manner as it is put on, there is no twisting of the line. By designing the reel so that it is small and compact with the spool close to the rod, and retrieving the fish line with the pull cord, it makes the process of fishing seem more natural and less mechanical than with a reel with a handle, which has the spool farther away from the rod. With the reel back of the hand, balancing the rod, casting is easier and the lure can be stopped in flight by touching the line with one finger of the hand holding the rod.

The spring arms 47 may be secured as by welding to the nut 45, and the disk 40 may be welded to the spring arms 47. The pin 37 may move from the position shown in Figure 4 to the released position shown in Figure 6 when the fishing line is being cast. The lever 69 is moved down and sideways to latch it under the section 68 shown in Figure 6.

I claim:

1. In a spinning ratchet reel, a base adapted to be secured to a fishing rod, an arm secured to said base and including a widened end portion, a housing secured to said widened end portion and including a first and second section, a reel positioned in said housing and secured to said widened end portion, said reel including an annular base provided with a cutout, and a support member positioned in said housing and including a tapered skirt of increased diameter, an end wall on said support member provided with a central opening, the interior of said reel being hollow and defining a chamber, a shaft extending through said reel and including an annular collar seated in the opening in said end wall, there being a longitudinally extending bore in said shaft, said shaft further including a cylindrical portion and a gear member including a plurality of teeth, a spool rotatably positioned in the chamber in said reel and including a hub rotatably mounted on said shaft, a first, second and third annular partition extending outwardly from said hub, a spring member circumposed on said hub and interposed between said first and second partitions, one end of said spring member being connected to said hub and the other end of said spring member being connected to said support member, a pull cord wound on said hub between said second and third partitions and having a finger engaging piece on its free end, there being an opening in the first section of said housing, said pull cord extending through said support member and through the opening in the first section of said housing, said support member having a fishing line wound thereon, there being an opening in the second section of said housing for the projection therethrough of said fishing line, a pin slidably mounted in the bore in said shaft, a head on the inner end of said pin, a plurality of yieldable body members secured to said head for selectively positioning the fishing line on the support member, a disc rotatably connected to said shaft and to said spool and including an annular flange provided with a plurality of apertures for slidably receiving the ends of said body members, a spring member having one end secured to said arm and including a pair of offset shoulders, a rod pivotally connected to said arm and mounted for movement into and out of engagement with said offset shoulders, a plate secured to said rod and abutting the adjacent end of said pin, a first spring pressed pawl pivotally connected to the end wall of said support member and engaging said gear member, and a second spring pressed pawl pivotally connected to said first partition and engaging said gear member.

2. The structure as defined in claim 1, and further including a plurality of rollers journaled on said disc for engagement by said fishing line.

References Cited in the file of this patent

UNITED STATES PATENTS

| | | |
|---|---|---|
| 602,585 | Moore | Apr. 19, 1898 |
| 2,220,017 | Maynes | Oct. 29, 1940 |
| 2,293,755 | Joabson | Aug. 25, 1942 |
| 2,593,748 | Goldberg | Apr. 22, 1952 |
| 2,630,978 | Skarbek | Mar. 10, 1953 |
| 2,630,979 | Uerling | Mar. 10, 1953 |
| 2,644,647 | Denison et al. | July 7, 1953 |
| 2,716,301 | Lockwood | Aug. 30, 1955 |